US012579277B2

(12) United States Patent
Nhlabatsi et al.

(10) Patent No.: US 12,579,277 B2
(45) Date of Patent: Mar. 17, 2026

(54) QUANTIFYING SATISFACTION OF SECURITY FEATURES OF CLOUD SOFTWARE SYSTEMS

(71) Applicant: Qatar Foundation for Education, Science and Community Development, Doha (QA)

(72) Inventors: Armstrong Nhlabatsi, Doha (QA); Khaled Khan, Doha (QA); Jin Hong, Doha (QA); Dong Seong Kim, Doha (QA); Rachel Fernandez, Doha (QA); Noora Fetais, Doha (QA)

(73) Assignees: QATAR FOUNDATION FOR EDUCATION, SCIENCE AND COMMUNITY DEVELOPMENT, Doha (QA); QATAR UNIVERSITY, Doha (QA)

( * ) Notice: Subject to any disclaimer, the term of this patent is extended or adjusted under 35 U.S.C. 154(b) by 521 days.

(21) Appl. No.: 17/993,073

(22) Filed: Nov. 23, 2022

(65) Prior Publication Data

US 2023/0185925 A1     Jun. 15, 2023

Related U.S. Application Data

(60) Provisional application No. 63/282,468, filed on Nov. 23, 2021.

(51) Int. Cl.
*G06F 21/57* (2013.01)
*G06F 21/53* (2013.01)
*H04L 9/40* (2022.01)

(52) U.S. Cl.
CPC ............ *G06F 21/577* (2013.01); *G06F 21/53* (2013.01); *H04L 63/1433* (2013.01); *G06F 2221/033* (2013.01)

(58) Field of Classification Search
CPC .. G06F 21/577; G06F 21/53; G06F 2221/033; H04L 63/1433
See application file for complete search history.

(56) References Cited

U.S. PATENT DOCUMENTS

| | | | | |
|---|---|---|---|---|
| 9,462,010 | B1 | 10/2016 | Stevenson | |
| 10,404,737 | B1 | 9/2019 | Sweeney et al. | |
| 2016/0241581 | A1* | 8/2016 | Watters | G06F 21/552 |
| 2019/0199740 | A1* | 6/2019 | Zhang | G06F 21/53 |
| 2023/0328094 | A1* | 10/2023 | Brown | H04L 63/1433 726/23 |

OTHER PUBLICATIONS

Alberts et al., "Operationally Critical Threat, Asset, and Vulnerability Evaluation (OCTAVE) Framework, Version 1.0", Technical Report Prepared for Carnegie Mellon Software Engineering Institute (Jun. 1999), 82 pages.
Drissi et al., "Survey: Risk Assessment for Cloud Computing", International Journal of Advanced Computer Science and Applications (2013), 4(12), pp. 143-148.
Sharma et al. "Cloud Computing Risks and Recommendations for Security", International Journal of Latest Research in Science and Technology (2017), 6(1), pp. 52-56.

* cited by examiner

*Primary Examiner* — Ayoub Alata
(74) *Attorney, Agent, or Firm* — K&L Gates LLP

(57) ABSTRACT

A method of quantifying the satisfaction of security requirements is provided via characterizing a security feature; matching the security feature to a security metric; computing a quantification score that indicates the exploitability of a system to which the security feature is applied; and outputting the quantification score to a security analyst.

15 Claims, 3 Drawing Sheets

QUANTIFYING SATISFACTION OF SECURITY FEATURES OF CLOUD SOFTWARE SYSTEMS

CROSS-REFERENCES TO RELATED APPLICATIONS

The present disclosure claims priority to U.S. Provisional Patent Application 63/282,468 entitled "QUANTIFYING SATISFACTION OF SECURITY REQUIREMENTS OF CLOUD SOFTWARE SYSTEMS" and filed on Nov. 23, 2021, which is incorporated herein in its entirety.

BACKGROUND

Security features (often stated as "requirements") in computing environments are an important factor when considering different software, policy settings, and the like. Operators often consider these factors in isolation, and treat the fulfillment of the factors in a Boolean sense, as either fully compliant or fully non-compliant with the stated security goals.

SUMMARY

The present disclosure generally relates to quantifying the satisfaction of security features in cloud software systems, which may be provided as a method comprising various operations, a system including a processor and a memory that includes instructions, that when executed by the processor perform various operations, and a memory storage device that includes instructions, that when executed by a processor, perform various operations, wherein the operations include: characterizing a security feature; matching the security feature to a security metric; computing a quantification score that indicates the exploitability of a system to which the security feature is applied; and outputting the quantification score to a security analyst.

The reader will appreciate the foregoing details, as well as others, upon considering the following detailed description of certain non-limiting aspects including a method for quantifying security requirements.

DETAILED DESCRIPTION

Figure 1:
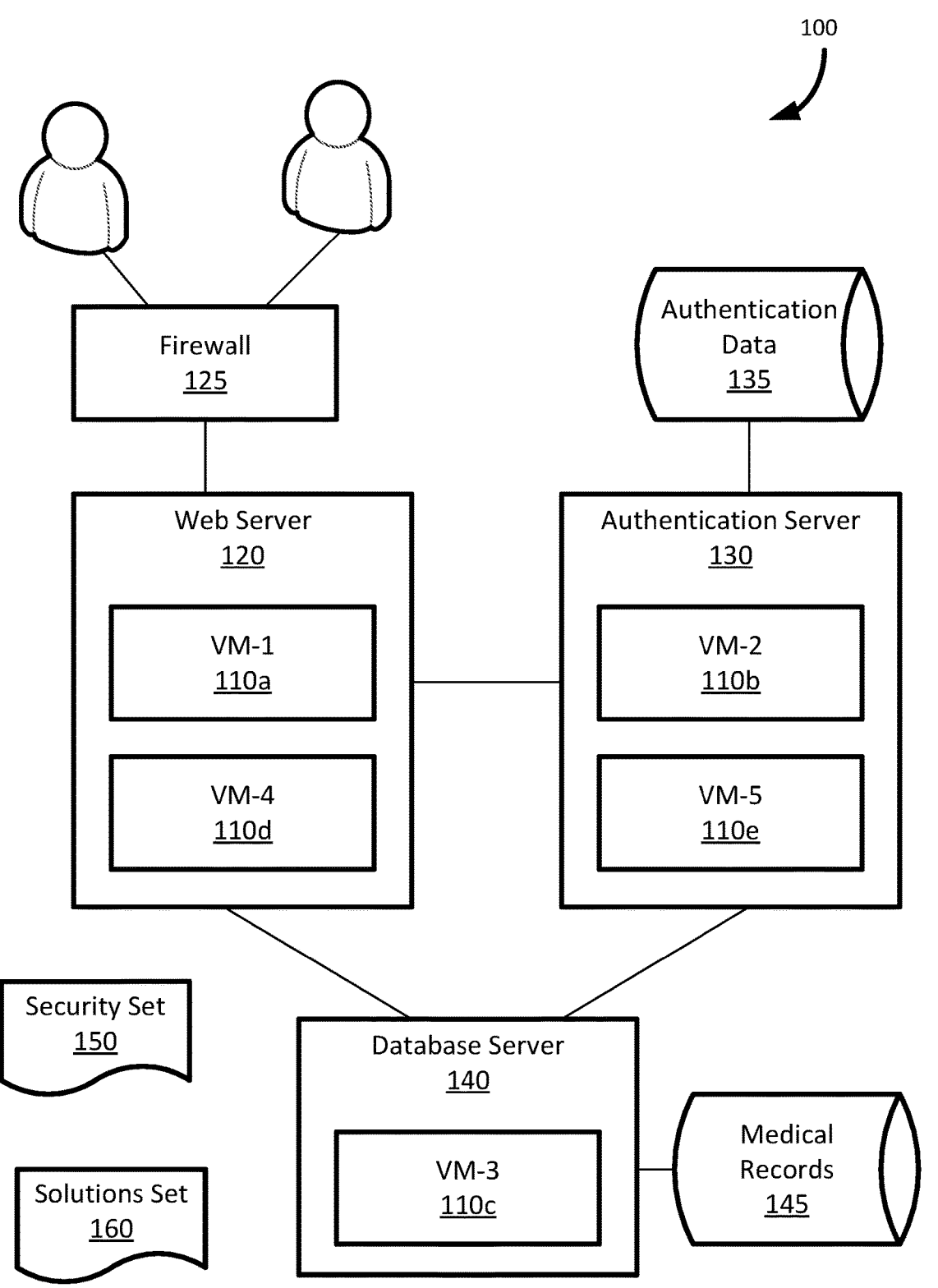
FIG. 1 illustrates a cloud computing environment for a patient medical record management application used by a hospital, as an example aspect in which the present disclosure may be practiced.

The present disclosure generally relates to quantifying the satisfaction of security requirements in cloud software systems, which may be provided as a method comprising various operations, a system including a processor and a memory that includes instructions, that when executed by the processor perform various operations, and a memory storage device that includes instructions, that when executed by a processor, perform various operations, wherein the operations include: characterizing a security feature; matching the security feature to a security metric; computing a quantification score that indicates the exploitability of a system to which the security feature is applied; and outputting the quantification score to a security analyst.

The satisfaction of a software feature is commonly stated as a Boolean value; a security feature is either satisfied (true) or not (false). However, a discrete Boolean value to measure the satisfaction level of a security feature by deployed mechanisms lacks nuance. Rather, it would be more effective to quantify the level of satisfaction of security features on a continuous scale. The approach described herein achieves the more-nuanced result for cloud software systems based on relationships between defense strength, exploitability of vulnerabilities, and attack severity by extending the concept of entailment relationship from the field of requirements engineering with the satisfiability aspects of security features. The presently described approach enables users and system administrators to systematically structure security concepts into various sets of related descriptions to quantify the satisfaction level of security features with the deployed. As a result, security administrators are able to deploy more effective and appropriate security solutions based on their assessment.

The quantification of security features has the potential to enable security administrators of cloud service providers (CSP) to perform two important tasks: (1) systematic quantification of security resources needed for defense; and (2) designing more effective security solutions. Quantification of the level to which a security feature is satisfied by a security solution could help determine how much resources are needed in order to raise the level of satisfaction to the required target. The quantification can also guide security administrators to allocate appropriate resources efficiently to meet their security features with reduce cost.

As used herein, software features describe conditions or properties that should be met and possessed by the system to be developed, in which there are two types of features: functional features and nonfunctional features. Functional features describe the functions that the systems should be able to perform, such as computing a given metric. The non-functional features constrain and qualify functional features by stating qualities (such as security) that the function must possess. For example, the given metric computed by the function can only be seen by persons of a given security clearance.

One key challenge in cloud computing is how the cloud clients can verify as well as ensure that the strength of the security mechanisms employed by the Cloud Service Provider (CSP) satisfies the clients security nonfunctional features. For example, for a security feature, in order to trust the CSPs, the cloud clients need a mechanism to verify the satisfaction of specific security features of interest. Although in a locally managed computing environment, Boolean conclusions on the satisfaction of a security feature can be useful (and reliably reached), for cloud computing environments, is not feasible to guarantee true or false satisfaction of a security feature. Other approaches that provide graded assessments of satisfaction lack relational implications of various features being satisfied or not, such that an assessment that a security risk is "low", "medium", or "high" provides few insights into the system or what the assessment means to the end-user (and are often mere thresholds based on a percentage of features marked, via Boolean conclusions, as satisfied/not).

The present disclosure uses entailment relationships to provided improvements to the management of computing environments that include cloud services, particularly in managing the security features of the computing environments from a client perspective. As used herein, The entailment relation relates three sets of descriptions: features (f), domain assumptions (w), and specifications (s). The relationships between the three descriptions are expressed in Formula 1.

$$s, w \vdash f \qquad \text{Formula 1}$$

A feature describes a condition or capability that must be met or possessed by a system. Features are optative descriptions of how the world would be, once the envisioned system is in place. For a Patient Records Management (PRM) system, this could be: the patients' medical records should only be known by the assigned doctors and nurses.

Domain assumptions describe facts about the behavior of the environment where a software system will be deployed. As used herein, the term context refers to the environment described in domain assumptions. In contrast to features, domain descriptions are indicative, meaning they describe objective truth about the context. In the PRM example, this could be: 'medical records are stored in an SQL Server database', 'the database is hosted in a Windows 10 computer system', and 'the computer system is accessible through the internet'.

Specifications describe how the system should behave in order to satisfy the conditions described in the features, given that the domain assumptions hold. For instance, the specification for the PRM could be: 'if the credentials supplied by a subject requesting to read/write a medical record are valid, then grant read/write access. Otherwise deny'.

When considered together, the structure of the security concepts in the factors of s, w, and f leads to the following argument: "Security Solutions($s_s$) will satisfy security features ($f_s$), given that conditions about the properties of the environment($w_s$) that were assumed during the design of the solutions hold". Which may be referred to as the security feature satisfaction argument, shown in Formula 2 as a special instance of Formula 1.

$$s_s, w_s \vdash f_s \qquad \text{Formula 2}$$

The security feature satisfaction argument has a practical implication for information security in that security solutions can only be guaranteed to satisfy security features if the threats, attacks, and vulnerabilities remain the same as assumed. Stated differently, if there is any change in the assumptions, then the fitness of a solution to satisfy the intended security requirements needs to be re-evaluated. For example, the discovery of a new malware (Threat) implies that the environment of the security solution (anti-malware) has changed, as this malware was not known at the time of designing the anti-malware system. The anti-malware database should be updated in order to learn how to recognize and contain the new malware, which in turn leads to an update of the anti-malware system in order to be able to take care of the new malware.

FIG. 1 illustrates a cloud computing environment 100 for a patient medical record management application used by a hospital, as an example aspect in which the present disclosure may be practiced. The cloud used for the computing environment consists of five virtual machines (VM) 110a-e (generally or collectively, VM 110). The first VM 110a and fourth VM 110d operate as a web server 120 in communication (via a firewall 125) with various end user (which may include attackers) over the Internet of another network, the second VM 110b and fifth VM 110e operate as an authentication server 130 in communication with a database storing authentication data 135, and the third VM 110c operates as a database server 140 in communication with a database storing sensitive information (medical records 145 in the present example. Each of the webserver 120, authentication server 130, and database server 140 are in communication with one another to provide the cloud services of access to the medical records 145 to authorized users over the Internet (or other network). Table 1 shows the security properties of the VMs 110 in the present example.

TABLE 1

| | | Security Properties | | | |
| --- | --- | --- | --- | --- | --- |
| VM | OS | Vulnerabilities | α | β | γ |
| VM1 | 1 | 1 | 3.6 | 0.22 | D |
| VM2 | 1 | 1 | 3.6 | 0.22 | D |
| | | 2 | 5.9 | 1.00 | T, I, D |
| VM3 | 2 | 3 | 5.9 | 1.00 | T, I, D |
| VM4 | 3 | 4 | 3.6 | 0.39 | D |
| VM5 | 3 | 5 | 5.9 | 0.13 | T, I, D |

In Table 1, the OS column stores the type of operating system installed on the VM 110. The Vulnerabilities column lists the vulnerabilities that the VM 110 has, depending on the associated OS type. Each vulnerability includes an identity number for the vulnerabilities that indicates Impact ($\alpha$), Exploitability ($\beta$), and threats ($\gamma$). The Impact is a measure of the amount of damage to an asset, should the vulnerability be exploited successfully. Exploitability is the probability by which the vulnerability can be successfully exploited. Threats is the set of threats that the vulnerability imposes on the computing environment 100, which may include Tampering (T), Information Disclosure (I), and Denial of Service (D), as non-limiting examples. These data are used to compute the overall vulnerability of each VM 110 and the cloud environment 100.

The records management system deployed in the cloud environment 100 include a security features set 150 that, for purposes of example, includes $f_1$ (e.g., a patient's medical record should only be viewed by the doctors assigned to the patient), $f_2$ (e.g., Updates and changes to a medical record should only be done by the doctor assigned to the patient), and $f_3$ (e.g., It should always be possible for doctors to retrieve and update medical records stored in the medical records database).

In the present example, the security administrator has provided a solutions set 160 that, for purposes of example, includes $s_1$, $s_2$, and $s_3$. In the present example, $s_1$ indicates authentication and access control solutions, such as "Using SQL Server Management Studio, the security administrator creates credentials/lo gins for each doctor. The validity of the credentials is checked by SQL Server authentication mechanisms every time there is a request to login to the medical records database" and "When creating each login, the security administrator sets the medical records database as the default resource to be accessed by the principal of the credentials." In the present example, $s_2$ indicates encryption an authorization solutions, such as, "128-bit symmetric keys created with Triple DES algorithm are used for encrypting of medical records entries" and "a mechanism is provided for assigning READ and WRITE privileges only to the doctors through the authorization feature in a SQL Server. Patients can only VIEW their medical records." In the present example, $s_3$ indicates denial of service mitigation solutions, such as, "The Web and Authentication servers are replicated and hosted in Windows and Linux server VMs. If one of these servers fails due to a Distributed Denial of Service (DDoS) attack, legitimate traffic can be diverted to another server while the default server is being fixed" and "A traffic flow monitoring tool is used to actively monitor the traffic volume flowing to the SQL Servers. If the traffic volume deviates from normal traffic, a DDoS attack is detected and the affected server is isolated. The IP addresses of the sources of the DDoS attacks are determined, and the firewall is reconfigured to block traffic from the offending nodes."

In the example scenario, the challenge for the security administrator is to assess and implement security solutions that would satisfy the security features, under various constraints (e.g., time, finances, security exceptions, conflicting specifications, etc.). Accordingly, by being able to measure the extent to which the security features are satisfied beyond a percentage of Boolean satisfied/not satisfied determinations can benefit the security of the computing environment 100 by identifying partial solutions that can improve the overall security of the operation, despite potentially fully fulfilling fewer security features in total.

Figure 2:
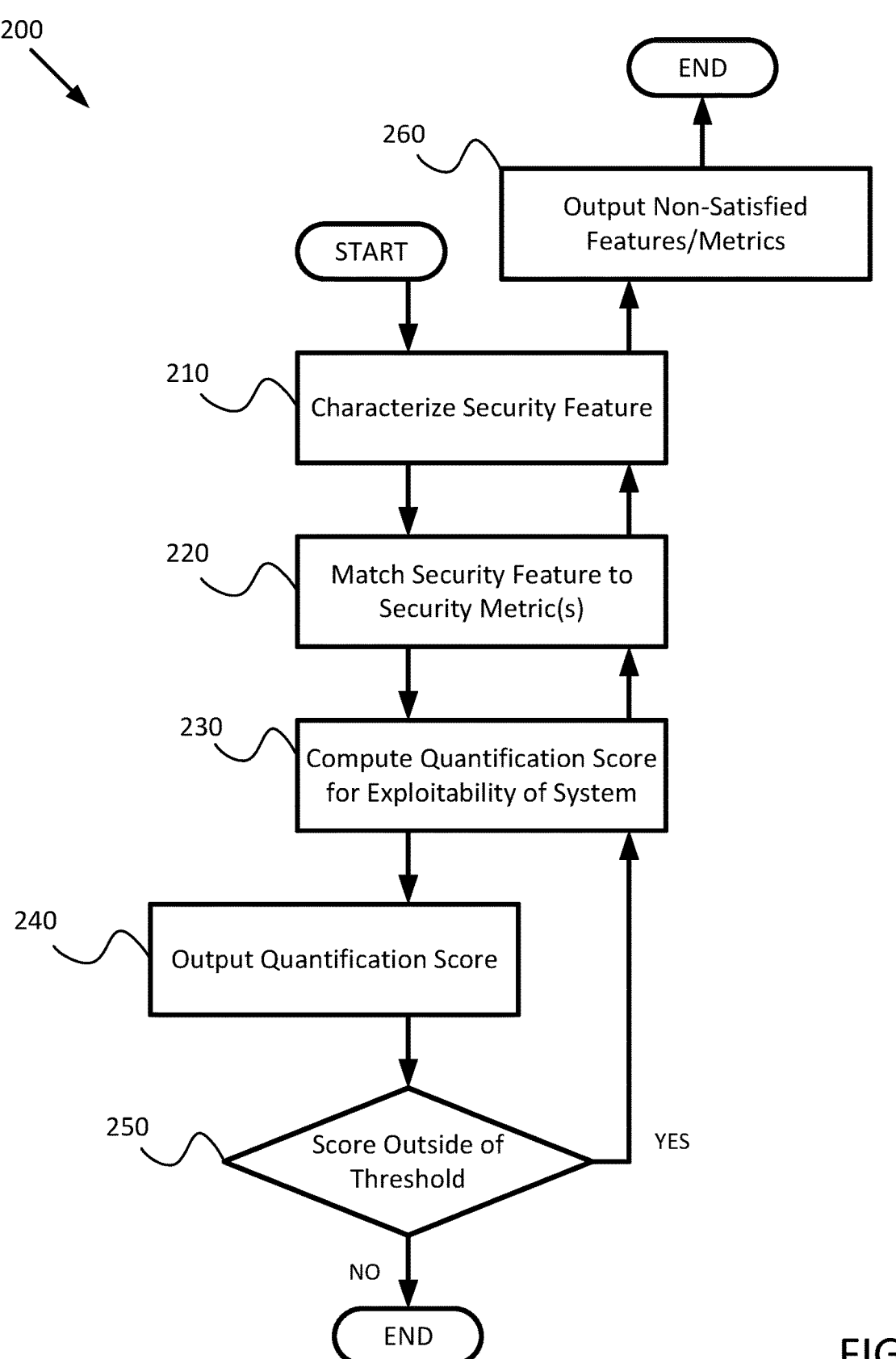
FIG. 2 is a flowchart of an example method, according to aspects of the present disclosure.

FIG. 2 is a flowchart of an example method 200, according to aspects of the present disclosure. The example method 200 begins at block 210, where the system characterizes security features. Cloud clients generally express their security requirements informally. Accordingly, at block 210, the system extracts special characteristics of the security features from the informal statements into a template. For each feature, the template requests two characteristics: (1) the asset being protected; and (2) what is to be protected about the asset.

The asset characteristic identifies the critical asset to be protected, and the value of the asset, which may include the expected impact due to an attack on the asset. The impact of an attack on an individual asset varies depending on its characteristics and values. For example, one of the assets to protect in a hospital system is a medical record. A medical record has numerous attributes such as patient identity, diagnosis of diseases, prognosis, and medications. For example, the impact of an attack on a medical record would be more serious if the patient were a celebrity or a public figure than a general member of the public. In another example, the name of a patient alone can be less valuable than the corresponding medical history associated with the name (e.g., the breach of patient privacy may be less severe (or not violated) when only an identity without associated medical history is revealed or no other personally identifiable information (PII) of a patient is revealed.

Accordingly, the value of an asset may vary because of what it is and what it is associated with. For example, the revelation of a list of ailments and how they can be treated does not violate anyone's privacy unless it is associated with the PII for which persons are being treated for those ailments. The value of an asset may also vary depending on the owner of the medical record. The consequences of the breach to a medical record of a celebrity or a public figure can have far more serious consequences compared to the breach to a medical record of an ordinary citizen.

Therefore, the identification of the properties and values of the assets to be protected is determined per block 210 for quantifying the extent to which security solutions satisfy the security features. A security solution deployed to ensure the confidentiality of a medical record belonging to an ordinary citizen may not be sufficient for the protection of the medical record of a celebrity. As used herein, the set of assets for a given security feature ($f_i$) is denoted with the symbol $\Omega(f_i)$.

The security objective characteristic relates to what security aspects of an asset are to be protected and what a security solution is meant to achieve. The security objective becomes useful when determining the security metrics that are related to the security requirements. The security objective varies depending on the nature of the asset to be protected. For example, confidentiality, integrity, and availability can be used as different classifications of security objectives, although other classifications can also be used.

A security objective can be applicable for more than one asset, and a single asset can have more than one security objective. Therefore, the characterization of a security feature (fi), denoted as F(fi), can result in the identification of a set of assets ($\Omega$), and a corresponding set of security objectives ($\Phi$) for the satisfaction of the feature. The set of assets can be mapped with the set of security objects as shown in the relation expressed in Formula 3.

$$F(f_i)=\Omega(f_i)\mapsto \Phi(f_i) \qquad\qquad \text{Formula 3}$$

At block 220, the system matches metrics based on the characteristics of the security features (e.g., per block 210). Given the characteristics (F($f_i$)) of the security feature ($f_i$), expressed in terms of the set of assets ($\Omega(f_i)$) mapped to corresponding set of security objectives ($\Phi(f_i)$), the system can then select suitable/matching security metrics. The security metrics are selected from a repository of known metrics. As vulnerabilities are weaknesses in the system, which can be exploited by attacks to violate satisfaction of security features, the selection of vulnerability metrics is guided by both the sets of assets ($\Omega(f_i)$) and security objectives ($\Phi(f_i)$), that characterize the security features. Assets may have vulnerabilities which vary depending on the nature of the asset, which implies that the vulnerability metrics may also vary depending on the asset. For example, vulnerabilities relevant to Windows 10 Web Server would be different from those found in a RHEL Authentication Server. The nature of the security objective also contributes to the selection of the vulnerability metrics that should be considered in the quantification of the security requirement.

For example, in case of a confidentiality feature that entails protection of information assets against unauthorized disclosure (such as $f_1$), a metric to measure password strength is relevant because a weak password can leave the information asset (e.g. a medical record) protected by an authentication mechanism implemented in the AuthenticationServers vulnerable to confidentiality threats as it might be easily cracked in information disclosure attacks such as brute force. The password strength metric may not be directly relevant in the case of a security feature for integrity as its security objective, such as $f_2$. Integrity features would have a different set of vulnerability metrics. As used herein, the vulnerability metrics relevant to a security feature $f_i$ with the symbol $\vartheta(f_i)$. In the present example, $\vartheta(f_i)=\{$Password Strength$\}$.

Similar to the selection of vulnerability metrics, the system selects attack metrics based on the security objective of the feature. That is, the matching metrics are selected based on the nature of security threats and their realization into attacks that can violate the security objective and lead to the feature not being satisfied. For example, if the security objective is integrity, then the matching metrics are those that are associated with tampering, such as malleability. As used herein, the set of defense metrics relevant to a security feature ($f_i$) are designated with the symbol $\kappa(f_i)$. For $f_2$, this will be expressed as $\kappa(f_i)=\{$Malleability$\}$.

The selection of defense metrics is determined by the characteristics of security solutions designed to mitigate against threats in order to attain the security objective. For example, one of the mitigation mechanisms for the integrity feature ($f_2$), the security solution $S_2$ involves using encryption to secure medical records against tampering attacks. In this case, a possible security metric is encryption key length, which determines the strength of an encryption mechanism. In the present disclosure, the set of attack metrics relevant to a security requirement $f_i$ is designated with the symbol $\Upsilon(f_i)$. In the present example, $\Upsilon(f_2)=\{$Encryption Key Length$\}$. Various defenses and attack metrics may be identified, and matched according to specified relationships in addition to the non-limiting examples given in the present disclosure.

At block 230, the system computes a quantification score to indicate the exploitability of the system. The system uses the selected security metrics for vulnerabilities, attacks, and defenses (per block 220) to compute the exploitability of vulnerabilities ($V(f_i, t)$), attack severity ($A(f_i, t)$), and defense strength ($D(f_i, t)$) respectively. These metrics may be combined via various formulas that weight the importance of the various metrics equally or differently for different user scenarios, and the present disclosure contemplates that one of ordinary skill in the relevant art will be able to select a contextually appropriate combining formula to ensure that each of the resulting values for $V(f_i, t)$, $A(f_i, t)$, and $D(f_i, t)$ are within (or are normalized to be within) the (inclusive) range from 0 to 1.

Using the attack severity, exploitability, and defense strength, the system quantifies the satisfaction of security features by taking a ratio of the defense side against the attack side. Stated differently, the system computes $\Re(f_i, t)$ as a function of $V(f_i, t)$, $A(f_i, t)$, and $D(f_i, t)$. The defense side includes the defense strength, $D(f_i, t)$. Meanwhile, the attack side is a product of attack severity, $A(f_i, t)$, and exploitability, $V(f_i, t)$. Formula 4 provides a computation for how strong is the defense side is compared to the attacker side.

$$R(f_i, t) = \frac{D(f_i, t)}{V(f_i, t) * A(f_i, t)} \qquad \text{Formula 4}$$

The numerator and denominator of Formula 4 are variables of defense and attack, respectively, and may be referred to herein as the defense side (DS) and the attack side (AS), respectively. Although a multiplication operation is used in the attack side, as the realization of threats into successful attacks depends on the availability of vulnerabilities to exploit, other operations that include various coefficients may be used in other aspects. The combination of attack severity and exploitability reflects that if a system is less vulnerable, then the chances of a successful attack are also reduced, regardless of the attack severity, and that the reverse is also true. As such, the relationship between vulnerabilities and attacks may be treated as proportional to one another.

The security features satisfaction equation is based on four principles: (1) exploitability of vulnerabilities, (2) strengths of defense and attack, (3) variable parameter value ranges, and (4) independence of variables.

The system computes the exploitability of a system, $V(f_i, t)$, from its vulnerabilities. However, not all the vulnerabilities in the system are relevant to a given security feature. Therefore, the computation of the exploitability of the system takes into account the characteristics of the particular security feature, which determine the relevant vulnerabilities. In various aspects, the system use vulnerabilities documented in a vulnerability database that identifies for each vulnerability the security objective(s) that can be violated if the vulnerability is exploited. The exploitability of the system with respect to a security feature $f_i$ is given by Formula 5, where $\vartheta(f_i)$ is the set of vulnerabilities relevant to feature $f_i$, $\beta(f_i)$ is the exploitability of vulnerability $v_j$, and V is the set of all vulnerabilities.

$$V(f_i, t) = 1 - \prod_{j=1}^{|\Upsilon(f_i)|} \left\{ 1 - \beta_{v_j} \right\}, \, v_j \in \vartheta(f_i), \, \vartheta(f_i) \subseteq V \qquad \text{Formula 5}$$

The principle that "the more exploitable the vulnerabilities are, the higher the probability of successful attacks" states that if a security solution has highly exploitable vulnerabilities then the chance of attacks exploiting those vulnerabilities succeeding increases. This is an important assumption because it forms the basis for the direct proportion relationship between the defense side variables, $V(f_i, t)$ and $A(f_i, t)$. The denominator of Formula 4 also implicitly states that the attack side is strongest in a system that is highly exploitable, and has high strength of attack.

The principal that "the stronger the defense, the lower the probability of successful attacks, and the higher the satisfaction of the features" states that if the defense side is stronger than the attack severity, then the probability of successful attacks is reduced and the satisfaction of the security feature is increased. The results of evaluating the satisfaction of security feature by a security solution can either be stronger, equivalent, or weaker. A security solution is said to be stronger if $\Re(f_i, t)>1$, equivalent if $\Re(f_i, t)=1$, and weaker if $\Re(f_i, t)<1$.

In the case of a stronger security solution, the defense side is stronger than attack severity by the value indicated by $\Re(f_i, t)$, and the security solution satisfies the security feature, which implies that more than necessary resources have been spent on defense for this security feature. As a result, the security solution may be unnecessarily too strong. The advantage is that the extra defense strength provides a leeway and leverage to temporarily counter any sudden increase in the attacker severity until a more permanent improvement in the security solution is found.

In the case of an equivalent security solution, the defense strength matches the attacker severity, (e.g., they are at equilibrium), which implies that the exact/appropriate amount of resources have been spent on defense, and the security feature is satisfied. However, this also means that should the attack side gain strength, there is no leeway left on the side of the defense to counter the increased attack severity. As a result, in such a situation there is a window of opportunity for the attacker to exploit the system until the security solution is fixed to counter the attack.

In the case of a weaker security solution, the defense side is weaker than attacker side by a factor of $|1-\Re(f_i, t)|$, and the security feature is not being satisfied. More resources may be requested to improve the security solutions to meet the shortfall in the defense strength. In various aspects, $\Re(f_i, t)$ can be greater than or equal to 0 and less than 1. When $\Re(f_i, t)=0$, it implies that the security solution is not effective at all, meaning there is no defense. For the other values, the security solution is in place but weaker than the product of attacks and vulnerabilities. As will be appreciated, this is generally not a desirable case from the defender's perspective.

One relationship between the defense (numerator) and attack (denominator) sides in Formula 4 is that by identifying as aspect of the denominator, the system also indirectly aspects about the numerator and vice versa. This indirect identification is based on the fact that the satisfaction of a security feature is a result of the interaction between defense and attack sides. For example, one could alternatively state that the defense is too weak or that the attack is too strong or severe to satisfy a security feature with the current resources. This type of inferred conclusion pair can be beneficial because by knowing the state of one variable, the state of the other variable can be inferred; however, for the quantification of a security feature, this is problematic because it implies that the defense and attack sides cannot be independently quantified and it renders Formula 4 incalculable. To avoid this dilemma, the system assumes that all variables are evaluated independently of each other. This assumption implies that nothing can be deduced from the value of one variable about other variables, regardless of their possible inherent relationship.

Accordingly, the system calculates the three variables independently of each other. $V(f_i, t)$ is computed from metrics about the exploitability of variables in the system. The vulnerability does not say anything about the possible severity of attacks $A(f_i, t)$ and defenses $D(f_i, t)$. $A(f_i, t)$ does not imply anything about $V(f_i, t)$ and $D(f_i, t)$, but only represents the degree of severity of possible attacks. The evaluation of $D(f_i, t)$ does not necessarily need to take into account $V(f_i, t)$ and $A(f_i, t)$, notwithstanding the basic premise that the design of a security solution makes assumptions about the possible attacks and weakness in the system. The evaluation of the strength of the security solution, $D(f_i, t)$, is based on a different set of metrics from those that are needed to evaluate $V(f_i, t)$ and $A(f_i, t)$. Accordingly, the three variables could be intrinsically dependent, but their evaluations are independent.

The security requirements satisfaction quantification in Formula 4 assumes a general case of security quantification where both $V(f_i, t)$ and $A(f_i, t)$ can be provided in the defense side. However, this is not always possible. Some quantification scenarios may have one or none of these defense side variables. To cater these cases, the present disclosure presents variations of the main quantification equation.

In a No Quantifiable Exploitability variation, when there are no tangible vulnerabilities that can be used to quantify exploitability of the system, $\mathfrak{R}(f_i, t)$ is given by ratio $D(f_i, t)$ and $A(f_i, t)$. This variation caters to the case in which the system can still be attacked, but there are no tangible vulnerabilities in the system to which the attacks are attributed. For example, DDoS attacks are possible because of the nature of the network (such as having limited bandwidth) instead of software vulnerabilities. The DDoS attack can still happen, in the absence of quantifiable software vulnerabilities. Formula 6 can be used for quantifying a security requirement in this case.

$$R(f_i, t) = \frac{D(f_i, t)}{A(f_i, t)} \qquad \text{Formula 6}$$

In a No Quantifiable Attack Severity variation, when in the absence of attacks with quantifiable strength that can exploit the vulnerabilities, $\mathfrak{R}(f_i)$ is given by ratio $D(f_i, t)$ and $V(f_i, t)$, as expressed in Formula 7. This variation covers the case if there are software vulnerabilities with no known attacks that may exploit them. A possible scenario where this is most likely is when the exploitability of the vulnerabilities are very low (e.g., they are almost impossible to successfully exploit), hence the absence of attacks that may successfully harm an asset by exploiting the existing vulnerabilities, or zero-day attacks that have not previously been observed.

$$R(f_i, t) = \frac{D(f_i, t)}{V(f_i, t)} \qquad \text{Formula 7}$$

In a No Quantifiable Attack Severity and Exploitability variation, when there are no quantifiable attacks or vulnerabilities, the quantification of the extent to which a security requirement is satisfied depends on the defense strength, $D(f_i, t)$, only. The implication is that if attach strength and exploitability are unknown, then the satisfaction of a security requirement is determined only by the defense strength as expressed by Formula 8. This scenario would be possible in a situation where all vulnerabilities have been patched, and there are no known possible attacks, and hence there is no tangible way to quantify both the exploitability of vulnerabilities and severity of attacks.

$$\mathfrak{R}(f_i, t) = D(f_i, t) \qquad \text{Formula 8}$$

In a Defense Strength Zero variation, when the defense strength, $D(f_i, t) = 0$, then regardless of the evaluation on the attack side, the quantification also defaults to a zero value, (e.g., $\mathfrak{R}(f_i, t) = 0$) to take care of the exceptional case where $D(f_i, t) = 0$ and either $V(f_i, t) = 0$ or $A(f_i, t) = 0$. In such a case, $\mathfrak{R}(f_i, t) = $ infinite, even though $D(f_i, t) = 0$. This is a misleading quantification result because there is no defense. Accordingly, in such a case, the quantification is set to zero.

As used herein, the "absence" of a variable (e.g., $V(f_i, t)$ or $A(f_i, t)$) in the quantification equations simply translates to that variable being assigned its maximum value (e.g., 1). This is equivalent to saying that since it is not feasible to quantify the variable, then we should assume its worst value. Similarly, if it is not possible to quantify the defense strength, $D(f_i, t)$, then its value is assumed to be 0, and it follows that $\mathfrak{R}(f_i, t) = 0$ in such cases. This assumption also caters for the extreme case in which there are no defenses in place.

For example, if one buys a router, and starts using it without changing the default password. An attacker, connected to the router can easily gain access to the configuration of the router using the default password obtained from the manufacturer's website. The attacker may change the router configuration such that devices of the owner are blocked from connecting to the internet via a network provided by the router. In this example, not changing the password entails (when the default password is public knowledge) having no defense against the attacker who wants to tamper with the router configuration.

It is worth noting that the quantification of a security feature evaluated from the relationship between defense and attack sides as expressed by Formula 4 (and the variants thereof) is, fundamentally a ratio, which implies that given any two different sets of values assigned to the variables $D(f_i, t)$, $A(f_i, t)$, and $V(f_i, t)$, that their evaluation can results to the same value of $\mathfrak{R}(f_i, t)$ regardless of the differences in the values. This is because, as a ratio, the evaluation is an expression of the relative strength between defense and attacker sides. For this reason, small values of $D(f_i, t)$, $A(f_i, t)$, and $V(f_i, t)$, can result in the same quantification as higher values, as long as the ratio remains the same.

At block 240, the system outputs the quantification score to a security analyst. When the quantification score satisfies a threshold value, the method 200 may conclude. When the quantification score does not satisfy the threshold value (e.g., being too high to too low), the system provides further analysis to the security analyst by returning to block 230 and performing block 220 and block 210 in the reverse of the earlier order. Given a particular quantification of the satisfiability of a security feature, it is important for the security designers to have the ability to systematically trace back the parameters/variables that resulted in the particular quantification value, which is especially important in the instances where a security feature is not being satisfied as it enables a security analyst to diagnose the failure in the satisfaction of the feature by identifying the parameters that have led to non-satisfaction. In order to address this challenge, the system leverages the forward traceability established through the algebraic quantification equation in Formula 4 from the relevant security metrics and variables specific to the security problem domain at hand.

Forward traceability follows method 200 from block 210 to block 220 to block 230, while backward traceability traverses method 200 from block 230 to block 220 to block 210. One objective of backward traceability is to identify the metrics that contributed to the security requirement not being satisfied. More specifically, backward traceability helps in providing explanations for why the features are not satisfied, what should be done to make these features more satisfied or to reach a desired level of satisfaction, and which metrics need to be adjusted to reach a desired satisfaction level.

Accordingly, after performing block 210 for backwards traceability, the method 200 may proceed to block 260, where the system outputs one or more features or metrics thereof that were not satisfied, after which the method 200 may conclude, or restart with updated security settings. In using backward traceability as a features satisfaction diagnostic tool, it is assumed that the system has no control over the strength of attacks. The implication of this assumption is that in adjusting the satisfaction of the security requirement, the system can only change the parameters in the defense strength $D(f_i, t)$ and exploitability $V(f_i, t)$ since these are the only parameters under the control of the system. The basis of the assumption is that it is unreasonable to assume that actions and behavior of the attacker are within the control of the defender. For example, the defender cannot determine how and when the attack will happen and how strong it will be. For this reason, the focus of the traceability is the defense and exploitability. The attack strength is taken as an uncontrollable variable.

Traditionally, in response to a risk assessment that has resulted into a higher than optimal risk evaluation, the security administrator would put mitigation mechanisms in place to lower the risk. But it is not clear what "low" or "high" risk actually entails with respect to satisfaction of the requirements under a traditional risk assessment regime. As a consequence of not considering security features, it is difficult to determine how low should a risk be, in order to be acceptable. The general practice is that as long as the risk is lower than some target value, it is deemed acceptable. Accordingly, the scales of "low", "medium" and "high" are made in comparison to a previous (or target) evaluation value.

For example, if the new risk evaluation obtained after putting mitigation mechanisms in place is lower than the previous one, then the systems may be considered more secure. But "more secure" does not necessarily mean or entail that the system is "secure enough". The consequence of an absence of consideration of a security feature in the risk assessment approaches is that it is hard to argue with certainty the effectiveness of the mitigation mechanism deployed in regards to the satisfaction of security requirements. Traditional risk assessment analysis provides no means for supporting the argument that the system is secure enough. In contrast, the present disclosure considers the characteristics of defense and attacks in the described assessment, which overcomes addresses this limitation in the prior art.

The feature quantification metric described herein is not a defense mechanism, but rather, it is aimed at measuring the security posture of a system based on known vulnerabilities and threats. The approach enables the analyst to not only evaluate whether an existing security solution satisfies a security feature, but the algebraic nature of the described quantification approach enables the security analyst to systematically explore what the effect of a variation of the relevant defense and attack metrics variables will be (on feature satisfaction) across a wide spectrum of the input values. Furthermore, the ability to choose various vulnerability, attack and defense metrics means new and emerging security metrics can be incorporated into the proposed framework and further enhance the security requirement analysis capabilities.

The quantification equips a security administrator with precise knowledge of how much to adjust a security solution to achieve a particular requirement satisfaction—thus avoiding potential over-expenditure on unnecessary countermeasures or under deployment of security measures. Such precise quantification has advantages over Boolean methods to expressing satisfaction of security requirements as it expresses satisfaction in concrete and precise terms.

Figure 3:
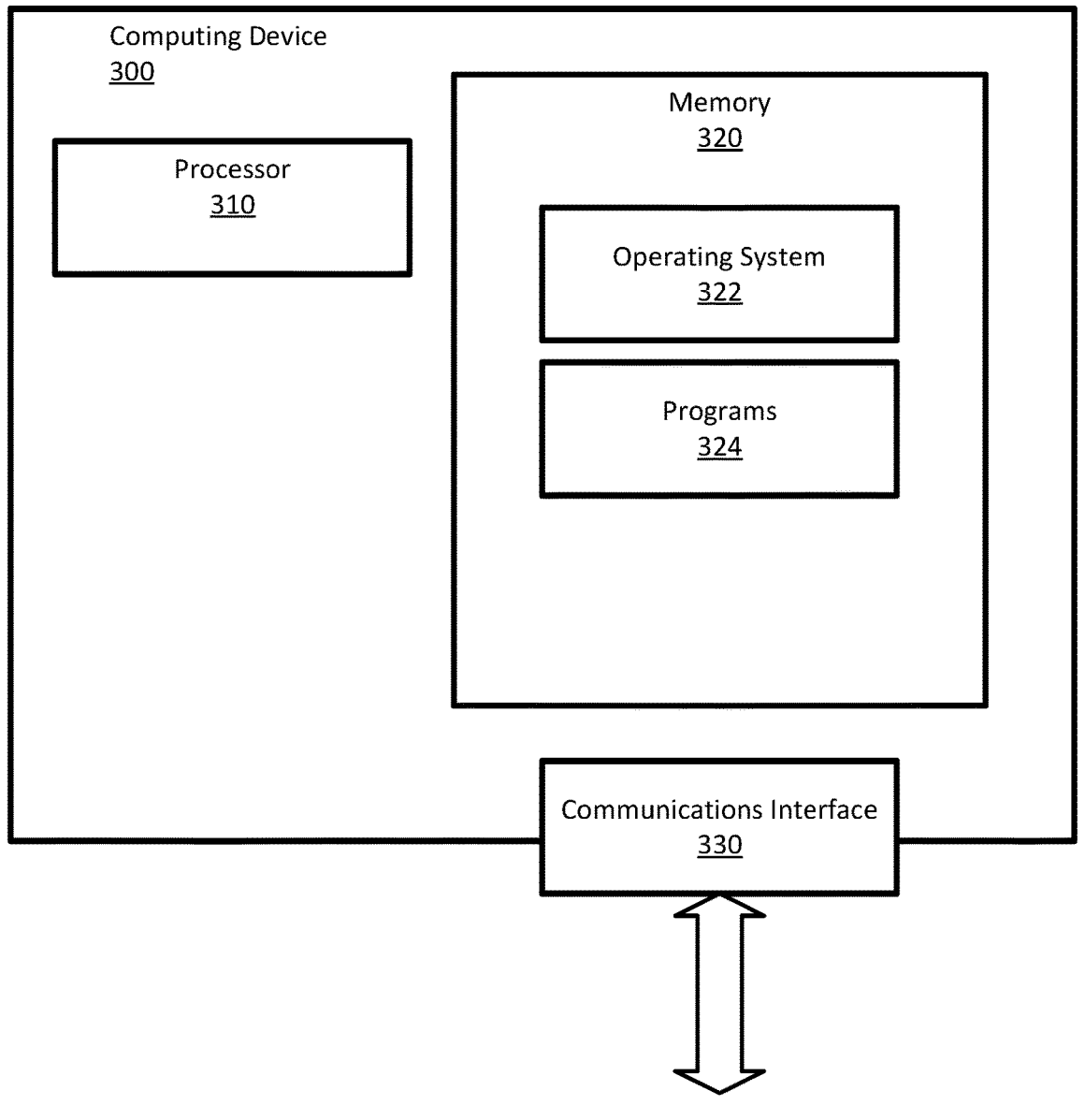
FIG. 3 illustrates a computer system, according to aspects of the present disclosure.

FIG. 3 illustrates a computer system 300, such as may be used to perform method 200 described in relation to FIG. 2, according to aspects of the present disclosure. The computer system 300 may include at least one processor 310, a memory 320, and a communication interface 330. In various aspects, the physical components may offer virtualized versions thereof, such as when the computer system 300 is part of a cloud infrastructure providing virtual machines (VMs) to perform some or all of the tasks or operations described for the various devices in the present disclosure.

The processor 310 may be any processing unit capable of performing the operations and procedures described in the present disclosure. In various aspects, the processor 310 can represent a single processor, multiple processors, a processor with multiple cores, and combinations thereof. Additionally, the processor 310 may include various virtual processors used in a virtualization or cloud environment to handle client tasks.

The memory 320 is an apparatus that may be either volatile or non-volatile memory and may include RAM, flash, cache, disk drives, and other computer readable memory storage devices. Although shown as a single entity, the memory 320 may be divided into different memory storage elements such as RAM and one or more hard disk drives. Additionally, the memory 320 may include various virtual memories used in a virtualization or cloud environment to handle client tasks. As used herein, the memory 320 is an example of a device that includes computer-readable storage media, and is not to be interpreted as transmission media or signals per se.

As shown, the memory 320 includes various instructions that are executable by the processor 310 to provide an operating system 322 to manage various operations of the computer system 300 and one or more programs 324 to provide various features to users of the computer system 300, which include one or more of the features and operations described in the present disclosure. One of ordinary skill in the relevant art will recognize that different approaches can be taken in selecting or designing a program 324 to perform the operations described herein, including choice of programming language, the operating system 322 used by the computer system 300, and the architecture of the processor 310 and memory 320. Accordingly, the person of ordinary skill in the relevant art will be able to select or design an appropriate program 324 based on the details provided in the present disclosure.

The communication interface 330 facilitates communications between the computer system 300 and other devices, which may also be computer system 300 as described in relation to FIG. 3. In various aspects, the communication interface 330 includes antennas for wireless communications and various wired communication ports. The computer system 300 may also include or be in communication, via the communication interface 330, one or more input devices (e.g., a keyboard, mouse, pen, touch input device, etc.) and one or more output devices (e.g., a display, speakers, a printer, etc.).

Accordingly, the computer system 300 is an example of a system that includes a processor 310 and a memory 320 that includes instructions that (when executed by the processor 310) perform various aspects of the present disclosure. Similarly, the memory 320 is an apparatus that includes instructions that when executed by a processor 310 perform various aspects of the present disclosure.

It should be understood that various changes and modifications to the presently preferred aspects described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A method, comprising:
characterizing a security requirement;
matching the security requirement to a security metric;
computing a quantification score that indicates an exploitability of a system to which the security requirement is applied; and
outputting the quantification score to a security analyst,
wherein the security metric is one of a plurality of security metrics matched to the security requirement, the method further comprising:
in response to the quantification score being below a satisfaction threshold, identifying, to the security analyst, at least one security requirement of a plurality of security requirements that was not satisfied, and
wherein the method is performed on a virtual machine of a cloud infrastructure including a virtual processor and a virtual memory.

2. The method of claim 1, wherein characterizing the security requirement further comprises:
identifying an asset in a computing environment to protect according to the security requirement; and
identifying a security objective of the security requirement to protect the asset.

3. The method of claim 1, wherein matching the security requirement to the security metric further comprises:
identifying an exploitability measure, a defense measure, and an attack strength measure.

4. The method of claim 3, wherein quantifying the security requirement further comprises:
computing the exploitability measure, the defense measure, and the attack strength measure to quantify a level of satisfaction of the security requirement.

5. The method of claim 1, wherein the security requirement is one of a plurality of security requirements characterized to quantify the exploitability of the system.

6. A system, comprising:
a processor; and
a memory including instructions that when executed by the processor perform operations that comprise:
characterizing a security requirement;
matching the security requirement to a security metric;
computing a quantification score that indicates an exploitability of a system to which the security requirement is applied; and
outputting the quantification score to a security analyst,
wherein the security metric is one of a plurality of security metrics matched to the security requirement, the operations further comprising:
in response to the quantification score being below a satisfaction threshold, identifying, to the security analyst, at least one security requirement of a plurality of security requirements that was not satisfied, and
wherein the processor comprises a virtual processor and the memory comprises a virtual memory provided as part of a virtual machine of a cloud infrastructure.

7. The system of claim 6, wherein characterizing the security requirement further comprises:
identifying an asset in a computing environment to protect according to the security requirement; and
identifying a security objective of the security requirement to protect the asset.

8. The system of claim 6, wherein matching the security requirement to the security metric further comprises:
identifying an exploitability measure, a defense measure, and an attack strength measure.

9. The system of claim 8, wherein quantifying the security requirement further comprises:
computing the exploitability measure, the defense measure, and the attack strength measure to quantify a level of satisfaction of the security requirement.

10. The system of claim 6, wherein the security requirement is one of a plurality of security requirements characterized to quantify the exploitability of the system.

11. A non-transitory computer readable memory including instructions that when executed by a processor perform operations comprising:
characterizing a security requirement;
matching the security requirement to a security metric;
computing a quantification score that indicates an exploitability of a system to which the security requirement is applied; and
outputting the quantification score to a security analyst,
wherein the security metric is one of a plurality of security metrics matched to the security requirement, the operations further comprising:
in response to the quantification score being below a satisfaction threshold, identifying, to the security analyst, at least one security requirement of a plurality of security requirements that was not satisfied, and
wherein the operations are performed on a virtual machine of a cloud infrastructure including a virtual processor and a virtual memory.

12. The computer readable memory of claim 11, wherein characterizing the security requirement further comprises:
identifying an asset in a computing environment to protect according to the security requirement; and
identifying a security objective of the security requirement to protect the asset.

13. The computer readable memory of claim 11, wherein matching the security requirement to the security metric further comprises:

identifying an exploitability measure, a defense measure, and an attack strength measure.

14. The computer readable memory of claim 13, wherein quantifying the security requirement further comprises:

computing the exploitability measure, the defense measure, and the attack strength measure to quantify a level of satisfaction of the security requirement.

15. The computer readable memory of claim 11, wherein the security requirement is one of a plurality of security requirements characterized to quantify the exploitability of the system.

* * * * *